US 6,698,565 B2

(12) United States Patent
Cool et al.

(10) Patent No.: US 6,698,565 B2
(45) Date of Patent: Mar. 2, 2004

(54) SELECTIVELY ENGAGEABLE DIFFERENTIAL

(75) Inventors: Dennis Cool, Royal Oak, MI (US); Richard Michael Krzesicki, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/210,967

(22) Filed: Aug. 2, 2002

(65) Prior Publication Data

US 2004/0020742 A1 Feb. 5, 2004

(51) Int. Cl.⁷ .................................................. F16H 1/22
(52) U.S. Cl. ...................... 192/94; 192/13 R; 192/84.6; 180/248
(58) Field of Search .............................. 192/35, 94, 92, 192/84.6, 12 R, 13 R, 13 A, 15; 180/233, 248, 249, 250

(56) References Cited

U.S. PATENT DOCUMENTS

| 4,805,486 A | | 2/1989 | Hagiwara et al. | |
|---|---|---|---|---|
| 4,895,236 A | * | 1/1990 | Sakakibara et al. | 192/84.6 |
| 4,909,776 A | * | 3/1990 | Sakakibara et al. | 474/25 |
| 4,976,347 A | * | 12/1990 | Sakakibara et al. | 192/20 |
| 5,019,021 A | | 5/1991 | Janson | |
| 5,092,825 A | | 3/1992 | Goscenski, Jr. et al. | |
| 5,279,401 A | | 1/1994 | Stall | |
| 5,423,235 A | | 6/1995 | Botterill et al. | |
| 5,462,496 A | * | 10/1995 | Dick et al. | 475/204 |
| 5,562,192 A | | 10/1996 | Dick | |
| 5,562,417 A | * | 10/1996 | Grimm et al. | 416/137 |
| 6,167,997 B1 | * | 1/2001 | Keeney | 192/40 |
| 6,484,857 B2 | * | 11/2002 | Vonnegut et al. | 192/35 |

* cited by examiner

Primary Examiner—Saul Rodriguez
(74) Attorney, Agent, or Firm—Brinks Hofer Gilson & Lione

(57) ABSTRACT

A differential assembly for an automotive vehicle includes a differential housing and a differential gear assembly mounted within the differential housing. A connector plate is adapted to connect to a drive shaft of the vehicle and a clutch pack is mounted within the differential housing that interconnects the differential gear assembly and the connector plate. A ball screw assembly is adapted to selectively apply axial force to the clutch pack, thereby engaging the connector plate and the differential gear assembly such that rotational movement of the connector plate is transferred through the clutch pack to the differential gear assembly.

10 Claims, 4 Drawing Sheets

SELECTIVELY ENGAGEABLE DIFFERENTIAL

TECHNICAL FIELD

The present invention generally relates to an automotive differential. More specifically, the present invention relates to an automotive differential which can be selectively engaged with the drive shaft of the vehicle.

BACKGROUND

In an automotive vehicle, a differential gear assembly is used to transfer power from a rotating driveshaft to the axles and wheels of the vehicle. The rotating driveshaft of the vehicle engages a ring gear which is mounted onto a differential housing. The end of the driveshaft and the ring gear are adapted to transfer rotation from the drive shaft to the differential housing such that the differential housing rotates transverse to the driveshaft.

Typically, the drive shaft is always engaged with the ring gear of the differential, however, at times it may be desirable to disengage the differential from the drive shaft. One way of doing this is to provide a clutch pack within the differential assembly which is mounted between and interconnects the differential to the drive shaft of the vehicle. When an axial force is placed upon the clutch pack, rotational motion will be transferred from the drive shaft, through the clutch pack, and to the differential.

One way of applying an axial force onto a clutch pack of this type is with a ball ramp. A ball ramp is comprised of a pair of plates having opposing channels formed therein. Within the channels are balls. The height of the balls is such that the plates are not allowed to touch. The channels are ramped such that when one plate rotates relative to the other, the balls will roll up the ramped channels and force the plates apart, thereby producing an axial force.

Over time, the channels within the plates will wear, which means less axial movement of the plates occurs as the ball bearings roll up the ramped surfaces. This reduces the amount of axial force produced by the ball ramp, and affects the performance of the clutch. The only way to repair this condition is to reposition or replace the ball ramp. Further, a ball ramp will only move a limited distance away from the clutch pack. Therefore, the clutch pack cannot be relieved further to allow cooling.

Therefore, there is a need for a differential having a clutch pack for selectively engaging the drive shaft of the vehicle and the differential having a device that applies an axial force to the clutch pack and can be tuned to accommodate for wear of the clutch pack and wear within the device, as well as allowing the device to be backed away from the clutch pack to allow the clutch pack to cool.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
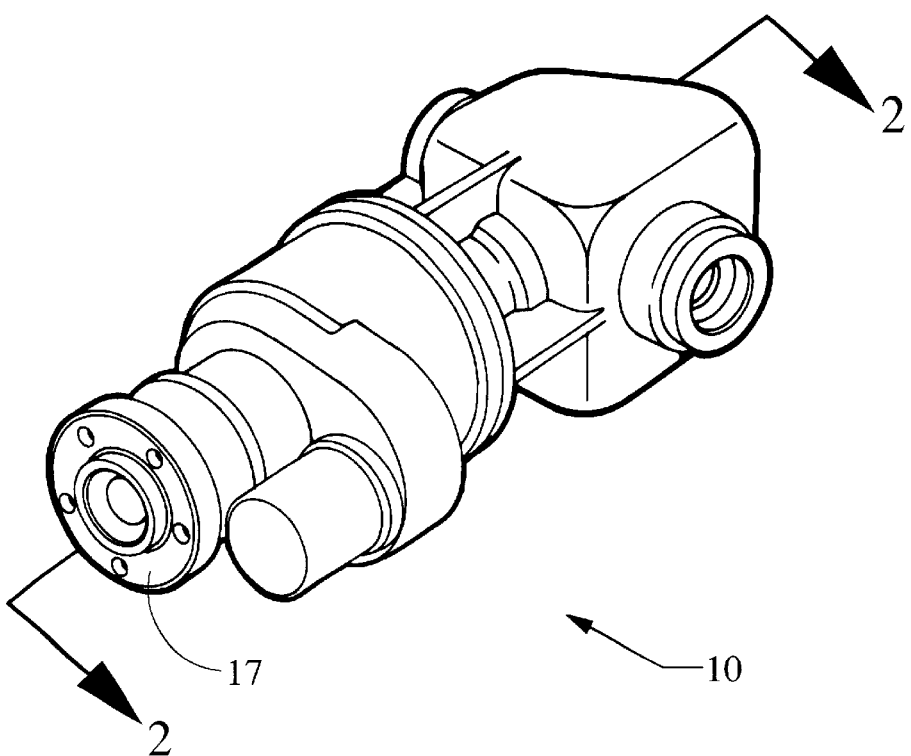
FIG. 1 is a perspective view of a differential assembly of a first preferred embodiment.
Figure 2:
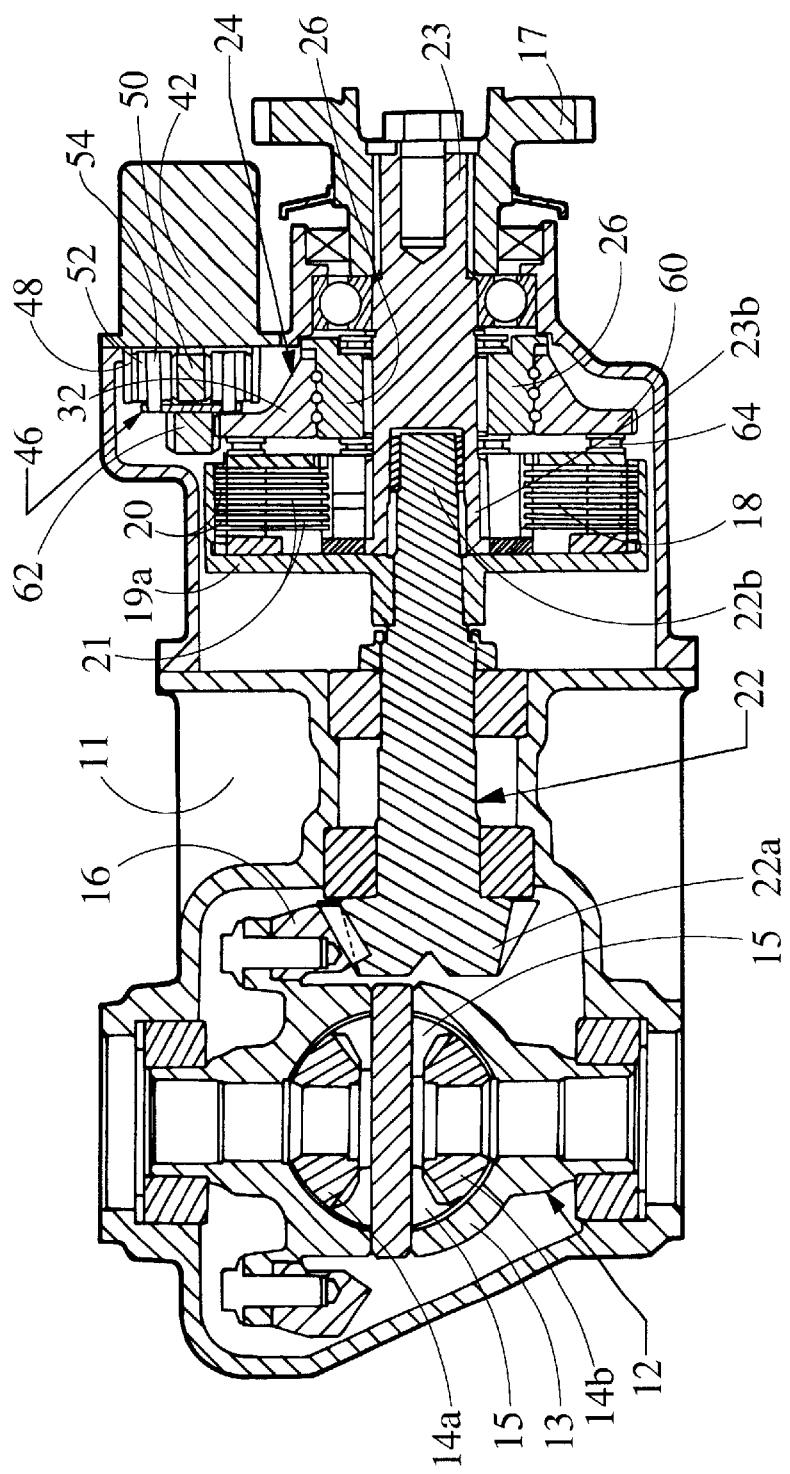
FIG. 2 is a sectional view taken along line 2—2 of FIG. 1.

Referring to FIG. 1, a differential assembly for an automotive vehicle is shown generally at 10. Referring to FIG. 2, the differential assembly 10 includes a differential housing 11 having a differential gear assembly 12 mounted therein. The differential gear assembly 12 includes a gear assembly housing 13 having first and second side gears 14a, 14b substantially axially aligned and spaced apart from one other. Each of the side gears 14a, 14b are supported by the gear assembly housing 13 and are allowed to rotate therein. Each of the side gears 14a, 14b are further adapted to engage an axle half-shaft (not shown) of the vehicle.

A plurality of pinion gears 15 substantially axially aligned and spaced apart from each other are mounted rotationally within the gear assembly housing 13. The pinion gears 15 engage the side gears 14a, 14b. A ring gear 16 is mounted to the gear assembly housing 13 and is adapted to transfer rotational movement from the drive shaft of the vehicle to the differential gear assembly 12.

A connector plate 17 is mounted to an end of the differential housing 11 and is adapted to connect to the drive shaft of the vehicle. Rotational motion from the drive shaft is transferred to the differential gear assembly 12 through the connector plate 17.

A clutch pack 18 is mounted between and interconnects the differential gear assembly 12 and the connector plate 17. Preferably, the clutch pack 18 includes a first section 19a and a second section 19b, a plurality of first plates 20 and a plurality of second plates 21. The first plates 20 include teeth formed within an outer diameter which engage corresponding teeth formed within an inner diameter of the first section 19a. The second plates 21 include teeth formed within an inner diameter which engage corresponding teeth formed within an outer diameter of the second section 19b. When an axial force is applied to the clutch pack 18, the first and second plates 20, 21 are forced together. If the force is sufficient, friction will prevent the first and second plates 20, 21 from relative rotation, thereby engaging the first and second sections 19a, 19b of the clutch pack 18 such that rotational motion is transferred across the clutch pack 18.

In the preferred embodiments, a prop shaft 22 is mounted within the differential housing 11. The prop shaft 22 includes a first end 22a which engages the ring gear 16 of the differential gear assembly 12, and a second end 22b which engages the first section 19a of the clutch pack 18. A connector shaft 23 is mounted within the differential housing 11 that includes a first end 23a which engages the connector plate 17 and a second end 23b which engages the second section 19b of the clutch pack 18.

A ball screw assembly 24 is mounted adjacent the clutch pack 18 to selectively apply axial force to the clutch pack 18, thereby locking the first and second sections 19a, 19b of the clutch pack 18 together such that rotational motion is transferred across the clutch pack 18. Thus, rotational motion is transferred from the connector plate 17 through the connector shaft 23 to the clutch pack 18, across the clutch pack 18 to the prop shaft 22, and to the differential gear assembly 12.

Preferably, the ball screw assembly 24 includes a hollow ball screw 26 mounted within the differential housing 11. The ball screw 26 includes an outer surface 28 having an outwardly facing helical channel 30 formed therein. A ball nut 32 extends circumferentially around the ball screw 26. The ball nut 32 includes an inner surface 34 having an inwardly facing helical channel 36 formed therein. The inwardly facing helical channel 36 of the ball nut 32 and the outwardly facing helical channel 30 of the ball screw 26 define a ball channel.

A plurality of balls 40 are positioned within the ball channel. The balls 40 provide a coupling between the ball screw 26 and the ball nut 32 such that rotational movement of the ball screw 26 and the ball nut 32 relative to one another is translated into axial movement of the ball nut 32 and the ball screw 26 relative to one another. A motor 42 engages the ball nut 32 to rotationally move the ball nut 32 relative to the ball screw.

Preferably, the ball screw 26 is rotatably and axially fixed within the differential housing 12. The ball nut 32 is rotatable and axially moveable relative to the differential housing 12. The motor 42 engages the ball nut 32 such that when the motor 42 is activated the ball nut 32 rotates relative to the ball screw 26 and the differential housing 12, thereby moving the ball nut 32 axially such that the ball nut 32 places an axial force onto the clutch pack 18.

Preferably, the motor 42 is an electric motor, that includes a brake. The brake will allow the motor 42 to be locked into position when the electric power to the motor 42 is cut off. Therefore, if the clutch pack 18 is to be engaged for an extended period of time, the brake can be engaged, and the power to the motor 42 turned off. In this way, the life of the electric motor 42 can be prolonged. Further, the electric motor 42 includes a planetary gear set 46 to provide a gear ratio between the motor 42 and the ball nut 32. The planetary gear set 46 includes a ring gear 48, a sun gear 50, and a plurality of planet gears 52 mounted within a planetary carrier 54 and positioned between and interconnecting the sun gear 50 and the ring gear 48. The electric motor 42 includes a stator and a rotor, and the ring gear 48 is mounted to the stator while the sun gear 50 is mounted to the rotor.

Figure 3:
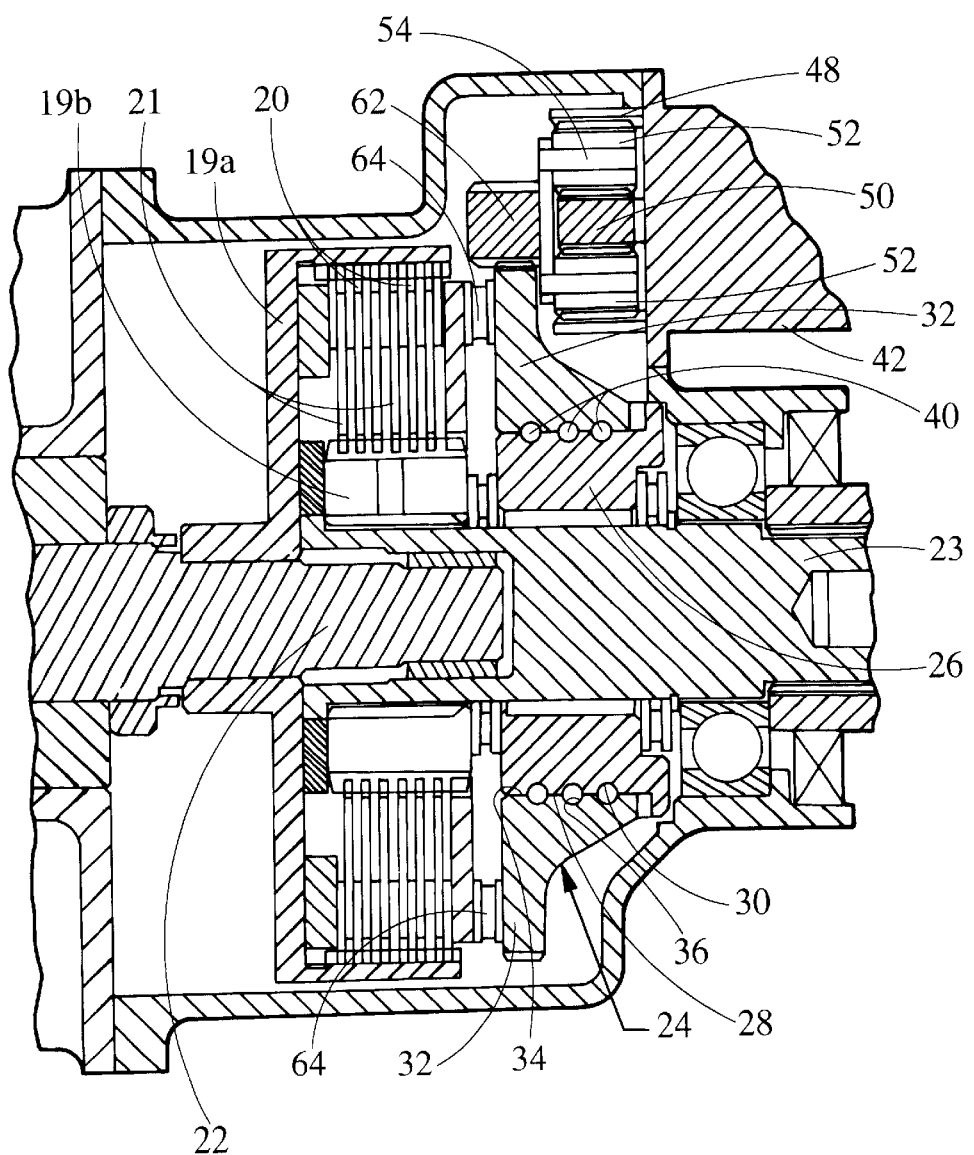
FIG. 3 is an enlarged view of a portion of FIG. 2.

Referring to FIGS. 2 and 3, in a first preferred embodiment, the ball nut 32 includes a first spur gear 60 and the motor 42 includes a second spur gear 62. The motor 42 is mounted external to the differential housing 11, and the second spur gear 62 is mounted to the planetary carrier 54 such that as the planetary carrier 54 rotates, the second spur gear 62 will engage the first spur gear 60 and rotate the ball nut 32. As the ball nut 32 rotates, the ball nut 32 moves axially relative to the differential housing 11. The ball nut 32 moves axially toward the clutch pack 18 such that the ball nut 32 applies an axial force to the clutch pack 18, thereby locking the first and second sections 19a, 19b of the clutch pack 18 together.

Figure 4:
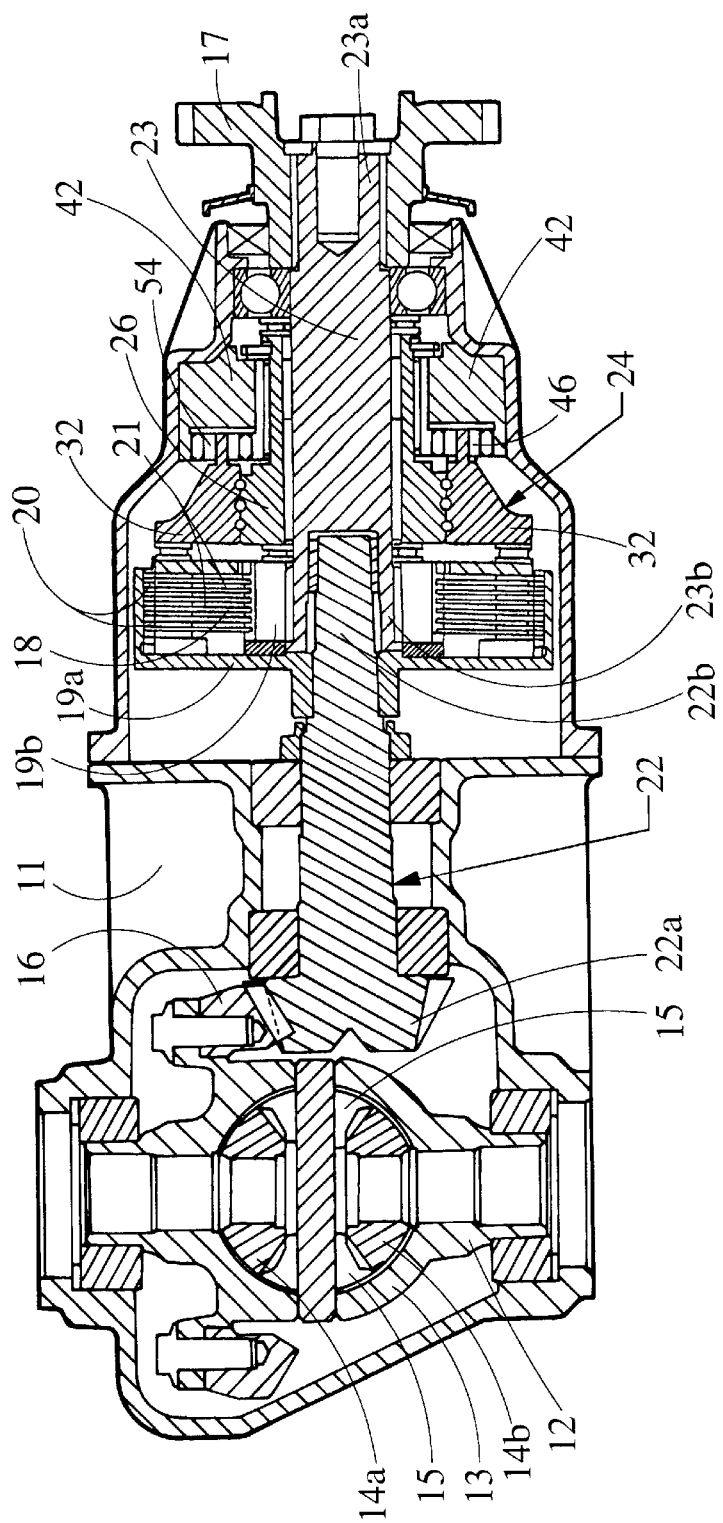
FIG. 4 is a sectional view similar to FIG. 2 of a second preferred embodiment.

Referring to FIG. 4, in a second preferred embodiment, the electric motor 42 is a hollow motor which is mounted within the differential housing 11 and extends circumferentially around the connector shaft 23. The ball nut 32 is attached to the planetary carrier 54 such that as the planetary carrier 54 rotates, the ball nut 32 rotates about the ball screw 26. As the ball nut 32 rotates, the ball nut 32 moves axially relative to the differential housing 11. The ball nut 32 moves axially toward the clutch pack 18 such that the ball nut 32 applies an axial force to the clutch pack 18, thereby locking the first and second sections 19a, 19b of the clutch pack 18 together.

In both the first or second preferred embodiments, the ball screw assembly 24 provides axial force to the clutch pack 18 that is not dependant upon wear within the clutch pack 18 or within the ball screw assembly 24. As the plates 20, 21 within the clutch pack 18 wear, the ball screw assembly 24 can progress further axially toward the clutch pack 18, thereby providing the same axial force to the clutch pack 18 as when the plates 20, 21 were new. The axial force exerted upon the clutch pack 18 is controlled by the motor 42, therefore, the ball screw assembly 24 will always advance until the axial force being exerted reaches the limitations of the motor 42. Therefore, the differential assembly 10 having a ball screw assembly 24 to actuate the clutch pack 18 is self-adjusting as the clutch pack 18 wears.

Additionally, the ball screw assembly 24 can be reversed beyond the capability of a ball ramp. Generally, the ball screw assembly 24 will reverse only enough to allow relative rotational movement between the first and second plates 20, 21 of the clutch pack 18, thereby disconnecting the connector shaft 23 from the prop shaft 22. However, under certain circumstances, it may be desirable to back the ball screw assembly 24 away from the clutch pack 18 even further to allow the plates 20, 21 within the clutch pack 18 to cool. This is easily accomplished with the ball screw assembly 24.

Further, the ball screw assembly 24 uses many ball bearings 40. Preferably, approximately fifty ball bearings 40 are positioned within the ball channel 38. Typically in a ball ramp there are three or four ball bearings supporting the entire axial load. The ball screw assembly 24 provides a larger number of ball bearings 40 to support the load, resulting in more even loading and less wear within the ball screw assembly 24.

Preferably, a thrust bearing 64 is positioned between the ball screw assembly 24 and the clutch pack 18. The thrust bearing 64 will allow axial force to be transferred from the ball screw assembly 24 to the clutch pack 18 while allowing the ball nut 32 to rotate relative to the clutch pack 18.

The foregoing discussion discloses and describes two preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A differential assembly for an automotive vehicle comprising:

a differential housing;

a differential gear assembly mounted within said differential housing;

a connector plate adapted to connect to a drive shaft of the vehicle;

a clutch pack mounted within said differential housing between and interconnecting said differential gear assembly and said connector plate; and a ball screw assembly adapted to selectively apply axial force to said clutch pack, thereby engaging said connector plate to said differential gear assembly such that rotational movement of said connector plate is transferred through said clutch pack to said differential gear assembly;

said ball screw assembly including an electric motor adapted to actuate said ball screw assembly, said electric motor having a stator and a rotor, and including a brake, such that said electric motor can be locked in position to maintain the position of the ball screw assembly when no power is supplied to the electric motor.

2. The differential assembly of claim 1 further including a prop shaft having a first end that engages said differential gear assembly and a second end, opposite said first end, which engages said clutch pack.

3. The differential assembly of claim 2 further including a connector shaft having a first end that engages said connector plate and a second end, opposite said first end, which engages said clutch pack.

4. The differential assembly of claim 3 wherein said ball screw assembly further includes:
- a hollow ball screw mounted within said differential housing, about said connector shaft, said ball screw including an outer surface having an outwardly facing helical channel formed therein,
- a hollow ball nut extending circumferentially around said ball screw, said ball nut including an inner surface having an inwardly facing helical channel formed therein,
- a ball channel defined by said inwardly facing helical channel and said outwardly facing helical channel;
- a plurality of ball bearings positioned within said ball channel, thereby coupling said ball screw and said ball nut such that rotational movement of said ball screw and said ball nut relative to one another is translated into axial movement of said ball nut and said ball screw relative to one another; and
- a said electric motor adapted to engage said ball, nut to rotationally move said ball nut and said ball screw relative to one another.

5. The differential assembly of claim 4 wherein said ball screw is rotatably and axially fixed relative to said differential housing and said ball nut is rotatable and axially moveable relative to said differential housing, said electric motor engaging said ball nut such that; when said electric motor is activated said ball nut rotates relative to said ball screw and said differential housing, thereby moving said ball nut axially relative to said differential housing such that said ball nut applies an axial force to said clutch pack and rotationally locks said prop shaft to said connector shaft, thereby transferring rotational motion from said connector plate to said connector shaft, from said connector shaft through said clutch pack to said prop shaft, and from said prop shaft to said differential gear assembly.

6. The differential assembly of claim 1 further including a thrust bearing positioned between said bail screw assembly and said clutch pack.

7. The differential assembly of claim 1 wherein said electric motor further includes a planetary gear set having a ring gear, a sun gear and a plurality of planet gears secured within a planetary carrier between and interconnecting said ring gear and said sun gear, said ring gear being attached to said stator, and said sun gear being attached to said rotor.

8. The differential assembly of claim 7 wherein said electric motor is a hollow motor mounted within said differential housing and said ball nut is attached to said planetary carrier such that rotational movement of said planetary carrier rotates said ball nut relative to said differential housing.

9. The differential assembly of claim 7 wherein said ball nut includes a first spur gear, and said electric motor includes a second spur gear mounted to said planetary carrier and engaging said first spur gear such that rotational movement of said planetary carrier rotates said ball nut relative to said differential housing.

10. The differential assembly of claim 1 wherein said differential gear assembly includes:
- a differential housing;
- a first side gear and a second side gear substantially axially aligned and spaced apart from one other, each of said side gears being supported by said differential housing for relative rotation therebetween and being adapted to engage an axle half-shaft;
- a plurality of pinion gears substantially axially aligned and spaced apart from each other, said pinion gears engaging said side gears; and
- a ring gear mounted to said differential housing adapted to transfer rotational movement from the drive shaft of the vehicle to said differential housing.

* * * * *

UNITED STATES PATENT AND TRADEMARK OFFICE
CERTIFICATE OF CORRECTION

PATENT NO. : 6,698,565 B2
DATED : March 2, 2004
INVENTOR(S) : Dennis Cool et al.

It is certified that error appears in the above-identified patent and that said Letters Patent is hereby corrected as shown below:

<u>Column 5,</u>
Line 5, immediately after "such that" delete ";" (semicolon).

<u>Column 6,</u>
Line 2, after "between said" delete "bail" and substitute -- ball -- in its place.

Signed and Sealed this

Eighth Day of June, 2004

JON W. DUDAS
*Acting Director of the United States Patent and Trademark Office*